No. 642,398. Patented Jan. 30, 1900.
VAN ALLEN WHITBECK.
CORN OR POTATO HILLER.
(Application filed Nov. 1, 1899.)
(No Model.)

WITNESSES:
INVENTOR
Van Allen Whitbeck
BY
ATTORNEYS

UNITED STATES PATENT OFFICE.

VAN ALLEN WHITBECK, OF AQUETUCK, NEW YORK.

CORN OR POTATO HILLER.

SPECIFICATION forming part of Letters Patent No. 642,398, dated January 30, 1900.

Application filed November 1, 1899. Serial No. 735,506. (No model.)

*To all whom it may concern:*

Be it known that I, VAN ALLEN WHITBECK, a citizen of the United States, residing at Aquetuck, in the county of Albany and State of New York, have invented a new and Improved Corn or Potato Hiller, of which the following is a full, clear, and exact description.

The object of my invention is to construct an implement especially adapted for hilling corn and potatoes in which the peculiar shape and adjustable arrangement of the moldboards with relation to the advance share will insure the soil as turned over being banked by the blades close to the rows of plants at each side of the furrow.

The invention consists in the novel construction and combination of the several parts, as will be hereinafter fully set forth and then pointed out in the claims.

Reference is to be had to the accompanying drawings, forming a part of this specification, in which similar characters of reference indicate corresponding parts in all the figures.

Figure 1:
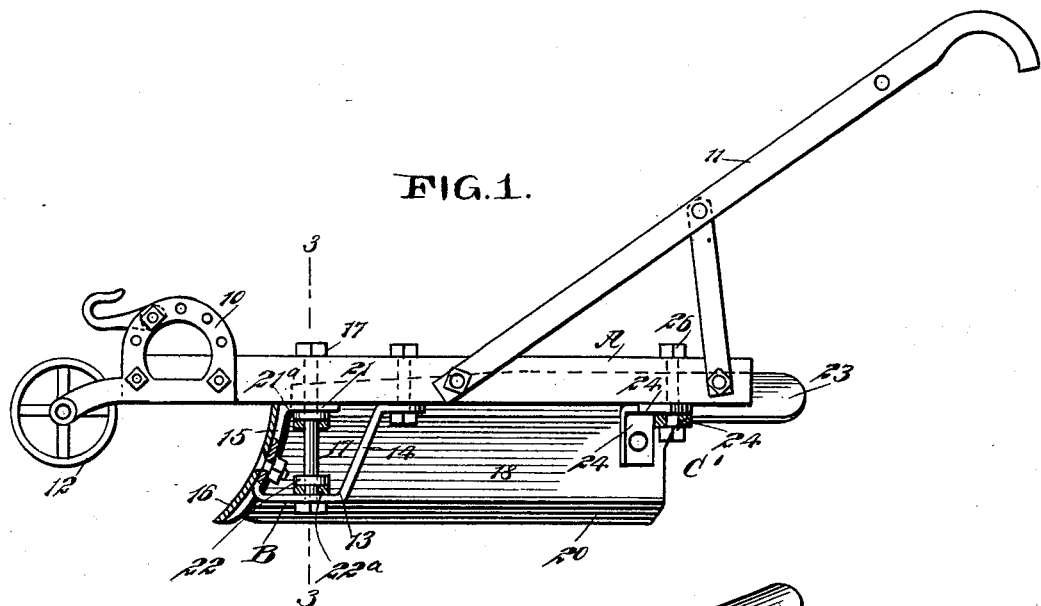
Figure 2:
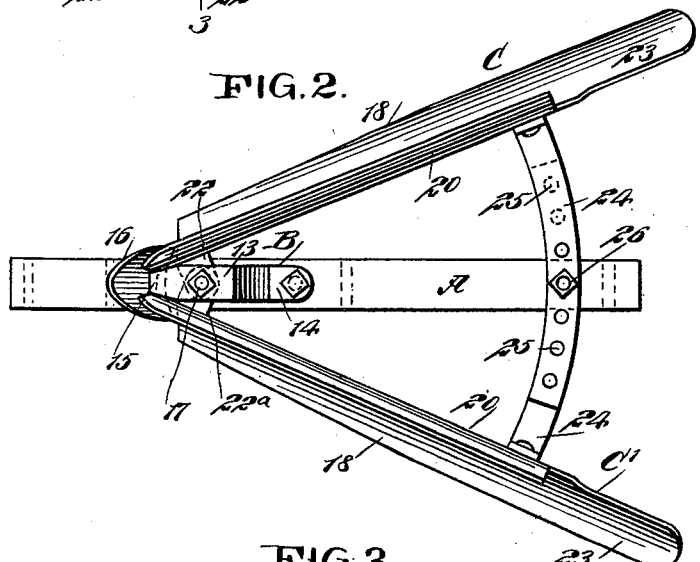

Figure 1 is a side elevation of the beam of the improved hiller and an inner face view of one of the moldboards and of the pivot connections of the opposing moldboard, the share being in vertical section. Fig. 2 is a bottom plan view of the improved hiller, the colter-wheel being omitted; and Fig. 3 is a vertical transverse section taken practically on the line 3 3 of Fig. 1.

An ordinary beam A is employed, provided with any approved form of clevis or draft device 10, handles 11, and colter-wheel 12. A bracket B is secured to the under face of the beam A near its center, and the said bracket preferably consists of a horizontal bottom member 13 and an upwardly and rearwardly inclined rear member 14 and a front member 15, as is shown best in Fig. 1, and said members are secured to the beam in any suitable or approved manner. A share 16, preferably of the cultivator type, is secured to the front member 15 of the bracket B, as shown in Figs. 1 and 2, and the said share 16 extends up practically to an engagement with the under face of the beam and downwardly below the bottom of the bracket B. A pivot-pin 17 is passed through the beam and through the bottom portion or member 13 of the bracket B, and this pivot-pin is arranged to receive and hold in position the forward end portions of moldboards C and C'. One of these moldboards is located at each side of the beam, and the moldboards stand at angles to one another, as shown in Fig. 2, having a rearward and outward inclination. The moldboards C and C' are of like construction and are of peculiar form. Each moldboard consists of a central longitudinal substantially straight section 18, an outwardly and upwardly inclined upper section 19, and an outwardly and downwardly inclined section 20, and each of the said moldboards is inclined at its forward end. The moldboard C at its forward end is provided on its inner face with two eyes 21 and 22, through which the pivot-pin 17 passes, while the opposing moldboard C' is provided with corresponding eyes $21^a$ and $22^a$, through which the pin 17 is also carried, as is shown in Fig. 3. The pivot ends of the moldboards are at the rear of and are protected by the share 16, and in any adjusted position of the said moldboards the forward ends of said moldboards are inside of the side edges of the share, so that the earth as turned up by the share will pass freely and uninterruptedly to the outer faces of the moldboards.

Figure 3:
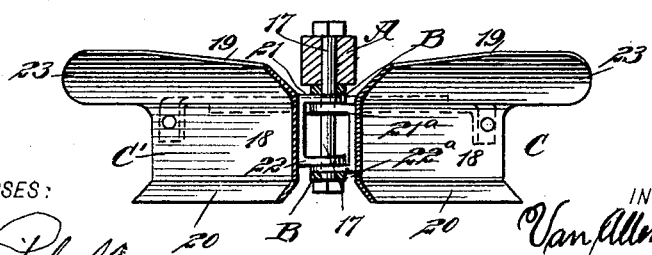

Each moldboard is provided with an extension 23 on its upper member 19, at the rear end of the said moldboard, as shown in Figs. 2 and 3, and the rear ends of the moldboards are adjusted relative to the beam and may be secured to the beam in adjusted position through the medium of segmental arms 24, provided with a series of longitudinal openings 25, and these arms are adapted to slide one over the other, being secured one to the inner face of each of the moldboards, as is illustrated in Fig. 2, and when the moldboards have been adjusted they are securely held to the beam by a suitable bolt 26, passed through registering apertures 25 in the adjusting-arms 24 and an opening produced in the rear portion of the beam A.

The peculiar formation of the moldboards insures the earth being carried up close to the roots of the plants and deposited on the upper portion of the rows of plants at the roots, the lower edges or members 20 serving to cut weeds or the like, while the upper members or sections 19 cause any dirt that may rise to be thrown downward, while the straight or body sections 18 of the moldboards conduct the dirt directly to the stems of the plants. The extensions 23 of the moldboards prevent the possibility of any dirt flying upward and over the moldboards at their rear ends, the dirt being brushed near the stalk of the plant and forming the desired hill over the roots. It is obvious that the implement can be quickly and conveniently adjusted to any width desired.

Having thus described my invention, I claim as new and desire to secure by Letters Patent—

1. In a hiller, a beam, a share connected with the beam, and moldboards having their forward ends at the rear of the said share, the said moldboards each comprising an approximately straight central longitudinal section, an outwardly and upwardly inclined upper section, and an outwardly and downwardly inclined bottom section, substantially as described.

2. In a hiller, the combination with a beam, a bracket secured to the said beam at its under side, and a share carried at the forward portion of the said bracket, of a pivot-pin passed through the beam and through the bottom portion of said bracket at the rear of the share, moldboards each having projections upon their inner faces, the projections on one moldboard overlapping the corresponding projections on the other moldboard, the said projections having registering openings through which the said pivot-pin passes, the forward ends of the moldboards being in all positions of said boards within the line of the side edges of the share, and means for adjusting the said moldboards at their rear ends.

3. In a hiller, the combination, with a beam and a share supported by the said beam, of moldboards pivoted at their forward ends at the rear of the said share, each moldboard being provided with a perpendicular central section, an upwardly and outwardly extending upper section, an outwardly and downwardly extending rear section, and an adjusting device for said moldboards, as set forth.

4. A moldboard having a central substantially straight longitudinal section, an upper longitudinal section having upward and rearward inclination, and an extension at its rear end beyond the body-section, together with a bottom section having a downward and rearward inclination from the body-section, as described.

5. In a hiller, the combination with a beam provided with a draft device, handles and a colter-wheel, of a bracket secured to the under face of the beam near its center, the said bracket having a horizontal bottom member and upwardly and rearwardly inclined rear and front members, a share secured to the front member of the bracket, moldboards pivoted at their forward ends at the rear of the said share, the pivot-pin of said moldboards extending through the beam and through the bottom member of the bracket, and adjusting devices for the rear portions of the said moldboards, substantially as described.

In testimony whereof I have signed my name to this specification in the presence of two subscribing witnesses.

VAN ALLEN WHITBECK.

Witnesses:
 ALDEN NODINE,
 H. W. ELMENDORF.